US007337136B1

(12) United States Patent
Burns et al.

(10) Patent No.: US 7,337,136 B1
(45) Date of Patent: Feb. 26, 2008

(54) METHOD FOR STRUCTURING, PRICING AND SETTING A CURRENT MORTGAGE PRICE INDICATOR CONTRACT

(75) Inventors: Robert J. Burns, Sterling, VA (US); Mustafa Chowdhury, Vienna, VA (US); Patricia M. Dodson, Herndon, VA (US); Cathy A. Gay, Vienna, VA (US); Marian J. Gora, Leesburg, VA (US); Mark D. Hanson, Potomac, MD (US); Gary D. Kain, Herndon, VA (US); Gregory J. Parseghian, McLean, VA (US); Cindy K. Smith, Vienna, VA (US); Robert W. Aufdenspring, Orlando, FL (US); Stanley J. Kon, Chapel Hill, NC (US); William F. Quinn, Shawnee Mission, KS (US)

(73) Assignee: Federal Home Loan Mortgage Corporation, McLean, VA (US)

( * ) Notice: Subject to any disclaimer, the term of this patent is extended or adjusted under 35 U.S.C. 154(b) by 1433 days.

(21) Appl. No.: 09/931,404

(22) Filed: Aug. 17, 2001

Related U.S. Application Data

(60) Provisional application No. 60/226,589, filed on Aug. 21, 2000.

(51) Int. Cl.
*G06Q 40/00* (2006.01)
(52) U.S. Cl. .................. 705/36 R; 705/38
(58) Field of Classification Search .......... 705/35–38
See application file for complete search history.

(56) References Cited

U.S. PATENT DOCUMENTS 6,070,151 A * 5/2000 Frankel ............ 705/36 R
6,185,543 B1 * 2/2001 Galperin et al. ......... 705/38
6,321,212 B1 * 11/2001 Lange ................. 705/36 R
6,460,021 B1 * 10/2002 Kirksey ................ 705/35
7,024,384 B2 * 4/2006 Daughtery, III ........ 705/36 R

OTHER PUBLICATIONS

Nothaft, Frank E., Vassilis Lekkas, and George HK Wang. "The Failure Of The Mortgage-Backed Futures Contact." The Journal of Futures Markets. Aug. 1995; 15, 5, p. 585.*

(Continued)

*Primary Examiner*—Hani M. Kazimi
*Assistant Examiner*—Daniel Kesack
(74) *Attorney, Agent, or Firm*—Oblon, Spivak, McClelland, Maier & Neustadt, P.C.

(57) ABSTRACT

A current mortgage price indicator futures contract ("Mortgage Futures Contract") that can be traded on a futures exchange. The contracts add value over existing hedging and speculating alternatives by meeting the needs of a wide range of mortgage and mortgage-backed securities (MBS) market participants such as portfolio managers, dealers, hedgers, originators, speculators and arbitrageurs. The Mortgage Futures Contract is based upon conventional MBS and has a relatively current coupon composition, thereby resulting in risk properties that appeal to market participants more so than prior contracts based on non-conventional MBS that were not correlated to current MBS production. The Mortgage Futures Contract has a cash settlement feature designed to eliminate complicated and largely uneconomic physical delivery of the underlying security. An options contract corresponding to the Mortgage Futures Contract and that can be traded on a futures exchange.

8 Claims, 13 Drawing Sheets

OTHER PUBLICATIONS

Frank E. Nothaft et al., *The Failure of the Mortgage-Backed Contract*, The Journal of Futures Markets, Aug. 1995, pp. 585-603.

Gregory Koutmos et al., *Hedging GNMA Mortgage-Backed Securities with T-note Futures: Dynamic Versus Static Hedging*, Real Estate Economics, Jun. 22, 1999, p. 335.

Elizabeth Tashjian, *Optimal Futures Contract Design: Futures Markets in the 21st Century*, 35 Quarterly Review of Economics and Finance 153 (Jun. 22, 1995).

John Morris, *"Ginnie Mae II" May Solve Pandora's Box Woes*, The American Banker, Oct. 18, 1983, p. 13.

Ben Weberman, *The Pioneer Instrument of Interest Rate Futures Is Dying: Is There a Way to Profit from its Death Throes?*, Forbes, Feb. 11, 1985, p. 186.

Commodity Futures Trading Commission, Notice of Proposed Contract Market Rule Change, 47 Fed. Reg. 11308 (Mar. 16, 1982).

Commodities Futures Trading Commission, Chicago Board of Trade; Proposed Amendments Relating to the Government National Mortgage association Certificate Delivery Futures Contract, 48 Fed. Reg. 46833 (Oct. 14, 1983).

Commodity Futures Trading Commission, Notice of Availability of the Terms and Conditions of Proposed Commodity Futures Contract, 48 Fed. Reg. 33029 (Jul. 20, 1983).

Commodities Futures Trading Commission, Chicago Board of Trade; Proposed Amendments Relating to the Government National Mortgage Association-II Futures Contract, 50 Fed. Reg. 34734 (Aug. 27, 1985).

Commodity Futures Trading Commission, Proposed Amendments Relating to GNMA Futures Contract and a Proposal to Recommence Trading in That Contract, 52 Fed. Reg. 48559 (Dec. 23, 1987).

Commodity Futures Trading Commission, Notice of Availability of the Terms and Conditions of Proposed Commodity Option Contract, 52 Fed. Reg. 48861 (Dec. 28, 1987).

Securities and Exchange Commission, Proposed Rulemaking, 52 Fed. Reg. 6340 (Mar. 3, 1987).

Commodity Futures Trading Commission, Publication of and Request for Comment on Proposed Rules Having Major Economic Significance; Amendment to the GNMA-CD Futures Contract of the Chicago Board of Trade, 45 Fed. Reg. 66493 (Oct. 7, 1980).

Securities and Exchange Commission, Self-Regulatory Organization, Proposed Rule Changes, 46 Fed. Reg. 19125 (Mar. 27, 1981).

Securities and Exchange Commission, Chicago Board Options Exchange, Inc.; Order Approving Amended Proposed Rule Change, 46 Fed. Reg. 15242 (Mar. 4, 1981).

Securities and Exchange Commission, Government National Mortgage Association Options Proposal, 45 Fed. Reg. 51016 (Jul. 31, 1980).

Securities and Exchange Commission, Chicago Board Options Exchange, Inc.; Order Approving Proposed Rule Change Relating to Deletion of Rules Concerning GNMA and Foreign Currency Options, 53 Fed. Reg. 35144 (Sep. 9, 1988).

Commodity Futures Trading Commission, Publication of and Request for Comment on Proposed Rules Having Major Economic Significance; Amendments to the GNMA-CD Futures Contract of the Chicago Board of Trade; Correction, 45 Fed. Reg. 70961 (Oct. 27, 1980).

David Kiley, *New GNMA Futures*, National Mortgage News, Apr. 28, 1986, p. 1.

Deborah Hargreaves, *The Financial Times Limited (London): CBOT to Launch Mortgage Contract*, 246 (Jun. 15, 1989).

National Mortgage News: Risk Management (Feb. 3, 1986).

John Morris, *The Bond Buyer: Chicago Board of Trade Launches Ginnie Mae II Futures Program*, 262 (Mar. 23, 1984).

Commodities Futures Trading Commission, Proposed Contract Market Designation for New York Futures Exchange's GNMA Contract Application, 46 Fed. Reg. 46276 (Sep. 17, 1981).

Securities and Exchange Commission, Chicago Board Options Exchange Inc., and Options Clearing Corp.; Filing and Order Approving Rule Changes, 47 Fed. Reg. 46934 (Oct. 21, 1982).

Securities and Exchange Commission, Options Clearing Components ("OCC"); Order Approving Proposed Rule Change, 47 Fed. Reg. 46941 (Oct. 21, 1982).

Securities and Exchange Commission, Sears Government Investment Trust, et al., Filing of Application for an Order of Exemption, 48 Fed. Reg. 24511 (Jun. 1, 1983).

Securities and Exchange Commission, Options Cleaning Corp. ("OCC"); Order Approving Proposed Rule Change, 46 Fed. Reg. 40849 (Aug. 12, 1981).

Securities and Exchange Commission, Chicago Board Options Exchange, Inc.; Filing of Proposed Rule Change, 46 Fed. Reg. 2439 (Jan. 9, 1981).

Securities and Exchange Commission, Self-Regulatory Organizations; Proposed Rule Change; Relating to Trading of GNMA Options, 46 Fed. Reg. 15242 (Mar. 4, 1981).

Arjun Chatrath et al., *Futures Commitments and Commodity Price Jumps*, The Financial Review, Aug. 1, 1999, p. 95.

*CBOT is Considering New Try at MBS Futures and Options*, The Mortgage Marketplace, Apr. 6, 1992, p. 1.

David C. Ling, *Mortgage-backed Futures and Options*, 21 Journal of the American Real Estate and Urban Economics Association 47-67 (Spring 1993).

*Nomura Writes MTGE Options Contracts*, Bondweek, Oct. 8, 1990, p. 4.

Chicago Board of Trade, "Charter, Bylaws, Rules and Regulations of the Chicago Board of Trade," Chapters 17 and 20 (Jun. 1983).

Bloomberg, L.P., "Three Cheers for the Pioneer: One of Wall Street's Old Friends is About to Retire", Bloomberg News, Sep. 7, 1999.

\* cited by examiner

| Ginnie Contract | Shortcomings | MFC Contract |
|---|---|---|
| GNMA GDR | 1. Conversion factors across coupons - cheapest to deliver MBS was that with the highest coupon - poor hedge for current coupon.<br>2. Introduction of Treasury contract. | 1. Conversion factors across Agencies only; not across coupons.<br>2. Treasury contract no longer as effective in hedging MBS basis. |
| GNMA GD | 1. Conversion factors across coupons - cheapest to deliver MBS was that with the highest coupon - poor hedge for current coupon.<br>2. Greater liquidity in CDR contract; marginal benefit in CD contract. | 1. Conversion factors across Agencies only; not across coupons.<br>2. Market needs a more effective, exchange-traded hedging instrument for mortgage basis. |
| GNMA II | 1. Narrow appeal of contract, in part, due to removal of delivery option.<br>2. Competing Treasury and CDR contracts. | 1. Contract designed to appeal to broad spectrum of mortgage market participants.<br>2. Market needs a more effective, exchange-traded hedging instrument for mortgage basis. |

*Fig. 1A*

| | | |
|---|---|---|
| Cash Settled | 1. Initial introduction of monthly contracts failed to obtain significant<br>2. Taint of failed CDR contract.<br>3. Poor market timing - wide MBS spreads. | 1. Initial introduction of quarterly contracts to obtain critical trading mass in one contract.<br>2. Significant change in market size and level of sophistication, and need for better tools.<br>3. Propitious market timing; significant volatility. |
| Mortgage Backed | 1. Initial introduction of monthly contracts.<br>2. Possibility of multiple contracts within the same delivery month.<br>3. Only marginal benefits over competing substitutes (Treasuries, futures & cash).<br>4. Poor market timing - low volatility. | 1. Initial introduction of quarterly contracts to obtain critical trading mass in one contract.<br>2. One contract per delivery month.<br>3. Significant benefits over competing substitutes: superior hedging effectiveness, credit, risk management, valuable basketing, Agency squeeze protection, ease of settlement.<br>4. Propitious market timing; significant volatility. |

*Fig. 1B*

| Year | LBMI Price Return | | | SBMI Total Return | | | | Conventional Par Price Return | | |
|---|---|---|---|---|---|---|---|---|---|---|
| | MFC | FN Par | 10 Yr Swap | 10 Yr Treas | MFC | FN Par | 10 Yr Swap | 10 Yr Treas | MFC | 10 Yr Swap | 10 Yr Treas |
| 1990 | 0.98 | 0.98 | 0.94 | 0.95 | 0.99 | 0.98 | 0.94 | 0.94 | 0.96 | 0.93 | 0.92 |
| 1991 | 0.99 | 0.85 | 0.53 | 0.77 | 0.97 | 0.86 | 0.58 | 0.80 | 0.83 | 0.77 | 0.89 |
| 1992 | 0.98 | 0.93 | 0.81 | 0.79 | 0.97 | 0.91 | 0.78 | 0.76 | 0.97 | 0.93 | 0.89 |
| 1993 | 0.79 | 0.64 | 0.53 | 0.47 | 0.83 | 0.66 | 0.54 | 0.51 | 0.88 | 0.95 | 0.73 |
| 1994 | 0.95 | 0.91 | 0.86 | 0.88 | 0.96 | 0.91 | 0.86 | 0.87 | 0.96 | 0.94 | 0.86 |
| 1995 | 0.90 | 0.96 | 0.86 | 0.92 | 0.92 | 0.96 | 0.84 | 0.90 | 0.89 | 0.88 | 0.94 |
| 1996 | 0.99 | 0.95 | 0.95 | 0.94 | 0.99 | 0.95 | 0.96 | 0.93 | 0.94 | 0.97 | 0.96 |
| 1997 | 0.99 | 0.99 | 0.88 | 0.92 | 0.98 | 0.98 | 0.86 | 0.90 | 0.97 | 0.93 | 0.95 |
| 1998 | 0.99 | 0.97 | 0.74 | 0.73 | 0.97 | 0.96 | 0.76 | 0.75 | 0.97 | 0.83 | 0.84 |
| 1999 | 0.96 | 0.90 | 0.72 | 0.40 | 0.98 | 0.90 | 0.73 | 0.42 | 0.97 | 0.91 | 0.66 |
| 90-94 | 0.92 | 0.83 | 0.75 | 0.80 | 0.91 | 0.81 | 0.73 | 0.77 | 0.92 | 0.91 | 0.85 |
| 95-99 | 0.95 | 0.94 | 0.84 | 0.78 | 0.95 | 0.93 | 0.82 | 0.77 | 0.95 | 0.92 | 0.88 |
| 90-99 | 0.93 | 0.86 | 0.78 | 0.79 | 0.91 | 0.84 | 0.77 | 0.77 | 0.93 | 0.88 | 0.84 |

| Year | MFC R² | Conventional Par Coupon R² | Conventional Par & Swap R² | 10 Yr Swap Coeff | Conventional Par Coupon Coeff | 10 Yr Swap T-Stat | Conventional Par Coupon T-Stat |
|---|---|---|---|---|---|---|---|
| 1990 | 0.98 | 0.98 | 0.98 | 0.17 | 0.88 | 1.41 | 4.20 |
| 1991 | 0.99 | 0.85 | 0.88 | -0.13 | 0.73 | -1.36 | 4.98 |
| 1992 | 0.98 | 0.93 | 0.95 | -0.20 | 0.78 | -1.57 | 4.91 |
| 1993 | 0.79 | 0.64 | 0.71 | -0.24 | 0.65 | -1.39 | 2.33 |
| 1994 | 0.95 | 0.91 | 0.91 | 0.02 | 0.70 | 0.08 | 2.21 |
| 1995 | 0.90 | 0.96 | 0.96 | 0.03 | 0.96 | 0.28 | 5.15 |
| 1996 | 0.99 | 0.95 | 0.96 | 0.19 | 0.49 | 1.11 | 1.52 |
| 1997 | 0.99 | 0.99 | 0.99 | -0.11 | 1.14 | -1.91 | 10.11 |
| 1998 | 0.99 | 0.97 | 0.98 | -0.05 | 0.69 | -1.67 | 9.37 |
| 1999 | 0.96 | 0.90 | 0.93 | -0.25 | 1.27 | -1.94 | 5.12 |

| | | | | | | | |
|---|---|---|---|---|---|---|---|
| 90-94 | 0.92 | 0.83 | 0.83 | -0.01 | 0.66 | -0.08 | 5.07 |
| 95-99 | 0.95 | 0.94 | 0.94 | -0.08 | 1.01 | -1.58 | 10.40 |
| 90-99 | 0.93 | 0.86 | 0.86 | 0.06 | 0.61 | 1.29 | 7.85 |

Fig. 4C

| Year | MFC R² | Conventional Par Coupon R² | Conventional Par & Swap R² | 10 Yr Swap Coeff | Conventional Par Coupon Coeff | 10 Yr Swap T-Stat | Conventional Par Coupon T-Stat |
|---|---|---|---|---|---|---|---|
| 1990 | 0.99 | 0.98 | 0.98 | 0.13 | 0.93 | 1.17 | 4.89 |
| 1991 | 0.97 | 0.86 | 0.87 | -0.09 | 0.69 | -0.93 | 4.56 |
| 1992 | 0.97 | 0.91 | 0.93 | -0.20 | 0.74 | -1.47 | 4.36 |
| 1993 | 0.83 | 0.66 | 0.74 | -0.29 | 0.74 | -1.62 | 2.64 |
| 1994 | 0.96 | 0.91 | 0.91 | 0.01 | 0.69 | 0.03 | 2.34 |
| 1995 | 0.92 | 0.96 | 0.96 | 0.00 | 1.07 | -0.03 | 4.91 |
| 1996 | 0.99 | 0.95 | 0.96 | 0.28 | 0.31 | 1.72 | 1.02 |
| 1997 | 0.98 | 0.98 | 0.99 | -0.15 | 1.19 | -2.34 | 9.05 |
| 1998 | 0.97 | 0.96 | 0.96 | -0.02 | 0.61 | -0.65 | 6.50 |
| 1999 | 0.98 | 0.90 | 0.93 | -0.24 | 1.29 | -1.79 | 4.92 |
| 90-94 | 0.91 | 0.81 | 0.81 | -0.02 | 0.66 | -0.21 | 4.87 |
| 95-99 | 0.95 | 0.93 | 0.93 | -0.08 | 1.02 | -1.42 | 9.13 |
| 90-99 | 0.91 | 0.84 | 0.84 | 0.06 | 0.61 | 1.25 | 7.24 |

| Year | MFC R² | 10 Yr Swap R² | 10 Yr Treas R² | Treas & Swap R² | MFC & Treas R² | MFC & Swap R² | MFC & Treas & Swap R² | 10 Yr Treas Coeff | MFC Coeff | 10 Yr Swap Coeff |
|---|---|---|---|---|---|---|---|---|---|---|
| 1990 | 0.93 | 0.93 | 0.92 | 0.94 | 0.97 | 0.97 | 0.97 | -0.09 | 0.68 | 0.25 |
| 1991 | 0.77 | 0.77 | 0.89 | 0.89 | 0.91 | 0.92 | 0.92 | 0.20 | 0.71 | 0.18 |
| 1992 | 0.93 | 0.93 | 0.89 | 0.94 | 0.99 | 0.99 | 0.99 | 0.11 | 0.76 | 0.22 |
| 1993 | 0.95 | 0.95 | 0.73 | 0.95 | 0.93 | 0.99 | 0.99 | -0.06 | 0.55 | 0.45 |
| 1994 | 0.94 | 0.94 | 0.86 | 0.94 | 0.96 | 0.97 | 0.97 | -0.20 | 0.73 | 0.35 |
| 1995 | 0.88 | 0.88 | 0.94 | 0.95 | 0.99 | 0.98 | 0.99 | 0.32 | 0.45 | 0.02 |
| 1996 | 0.97 | 0.97 | 0.96 | 0.97 | 0.97 | 0.97 | 0.98 | 0.26 | 0.27 | 0.18 |
| 1997 | 0.93 | 0.93 | 0.95 | 0.95 | 0.98 | 0.99 | 0.99 | 0.03 | 0.71 | 0.13 |
| 1998 | 0.83 | 0.83 | 0.84 | 0.86 | 0.99 | 0.99 | 0.99 | 0.07 | 0.92 | 0.04 |
| 1999 | 0.91 | 0.91 | 0.66 | 0.93 | 0.99 | 0.99 | 0.99 | 0.06 | 0.64 | 0.11 |
| 90-94 | 0.91 | 0.91 | 0.85 | 0.91 | 0.94 | 0.96 | 0.96 | -0.06 | 0.62 | 0.37 |
| 95-99 | 0.92 | 0.92 | 0.88 | 0.92 | 0.98 | 0.98 | 0.98 | 0.11 | 0.61 | 0.12 |
| 90-99 | 0.88 | 0.88 | 0.84 | 0.89 | 0.95 | 0.96 | 0.96 | -0.01 | 0.67 | 0.24 |

*Fig. 4D(i)*

| 10 Yr Treas T-Stat | MFC T-Stat | 10 Yr Swap T-Stat |
|---|---|---|
| -0.39 | 3.21 | 1.11 |
| 0.54 | 1.88 | 0.77 |
| 1.22 | 7.13 | 2.48 |
| -1.03 | 6.12 | 7.83 |
| -1.10 | 2.98 | 1.88 |
| 2.78 | 6.50 | 0.19 |
| 1.28 | 1.19 | 0.97 |
| 0.23 | 4.34 | 1.31 |
| 1.65 | 9.93 | 1.02 |
| 0.67 | 6.15 | 1.02 |
| -0.81 | 8.78 | 6.01 |
| 2.45 | 13.10 | 2.71 |
| -0.15 | 14.29 | 5.68 |

*Fig. 4D(ii)*

| Year | MFC R² | 10 Yr Swap R² | 10 Yr Treas R² | Treas & Swap R² | MFC & Treas R² | MFC & Swap R² | MFC & Treas & Swap R² | 10 Yr Treas T-Stat | MFC T-Stat | 10 Yr Swap T-Stat |
|---|---|---|---|---|---|---|---|---|---|---|
| 1990 | 0.98 | 0.94 | 0.95 | 0.95 | 0.99 | 0.99 | 0.99 | 0.25 | 5.09 | 0.81 |
| 1991 | 0.99 | 0.53 | 0.77 | 0.86 | 0.99 | 0.99 | 0.99 | 1.19 | 11.24 | -1.33 |
| 1992 | 0.98 | 0.81 | 0.79 | 0.82 | 0.98 | 0.98 | 0.98 | 0.19 | 8.88 | -0.85 |
| 1993 | 0.79 | 0.53 | 0.47 | 0.53 | 0.79 | 0.80 | 0.81 | 0.61 | 3.38 | -0.78 |
| 1994 | 0.95 | 0.86 | 0.88 | 0.89 | 0.95 | 0.96 | 0.96 | 0.30 | 3.58 | -0.91 |
| 1995 | 0.90 | 0.86 | 0.92 | 0.93 | 0.98 | 0.98 | 0.98 | 1.37 | 5.51 | 0.56 |
| 1996 | 0.99 | 0.95 | 0.94 | 0.95 | 1.00 | 0.99 | 1.00 | 2.02 | 9.59 | -0.79 |
| 1997 | 0.99 | 0.88 | 0.92 | 0.92 | 0.99 | 0.99 | 0.99 | -0.04 | 6.93 | 0.34 |
| 1998 | 0.99 | 0.74 | 0.73 | 0.76 | 0.99 | 0.99 | 0.99 | -0.72 | 18.43 | 0.94 |
| 1999 | 0.96 | 0.72 | 0.40 | 0.88 | 0.98 | 0.97 | 0.98 | -1.82 | 6.67 | 0.83 |
| 90-94 | 0.92 | 0.75 | 0.80 | 0.80 | 0.93 | 0.92 | 0.93 | 2.53 | 10.18 | -1.89 |
| 95-99 | 0.95 | 0.84 | 0.78 | 0.84 | 0.96 | 0.96 | 0.96 | 0.17 | 12.32 | 1.14 |
| 90-99 | 0.93 | 0.78 | 0.79 | 0.81 | 0.93 | 0.93 | 0.93 | 2.52 | 15.07 | -0.73 |

Fig. 4E

| Year | MFC R² | 10 Yr Swap R² | 10 Yr Treas R² | Treas & Swap R² | MFC & Treas R² | MFC & Swap R² | MFC & Treas & Swap R² | 10 Yr Treas T-Stat | MFC T-Stat | 10 Yr Swap T-Stat |
|---|---|---|---|---|---|---|---|---|---|---|
| 1990 | 0.99 | 0.94 | 0.94 | 0.95 | 0.99 | 0.99 | 0.99 | -0.03 | 7.43 | 1.02 |
| 1991 | 0.97 | 0.58 | 0.80 | 0.86 | 0.98 | 0.98 | 0.98 | 0.79 | 6.38 | -0.45 |
| 1992 | 0.97 | 0.78 | 0.76 | 0.80 | 0.97 | 0.97 | 0.97 | -0.22 | 6.99 | -0.58 |
| 1993 | 0.83 | 0.54 | 0.51 | 0.55 | 0.83 | 0.84 | 0.86 | 1.00 | 4.09 | -1.21 |
| 1994 | 0.96 | 0.86 | 0.87 | 0.89 | 0.96 | 0.96 | 0.96 | 0.02 | 3.80 | -0.83 |
| 1995 | 0.92 | 0.84 | 0.90 | 0.91 | 0.98 | 0.98 | 0.98 | 0.99 | 6.04 | 0.68 |
| 1996 | 0.99 | 0.96 | 0.93 | 0.96 | 1.00 | 1.00 | 1.00 | 0.41 | 8.55 | 0.98 |
| 1997 | 0.98 | 0.86 | 0.90 | 0.90 | 0.98 | 0.98 | 0.98 | -0.66 | 6.41 | 0.41 |
| 1998 | 0.97 | 0.76 | 0.75 | 0.78 | 0.97 | 0.97 | 0.97 | -0.28 | 7.82 | 0.85 |
| 1999 | 0.98 | 0.73 | 0.42 | 0.86 | 0.99 | 0.99 | 0.99 | -1.21 | 9.22 | 0.03 |
| 90-94 | 0.91 | 0.73 | 0.77 | 0.77 | 0.91 | 0.91 | 0.91 | 1.72 | 9.36 | -1.52 |
| 95-99 | 0.95 | 0.82 | 0.77 | 0.82 | 0.95 | 0.95 | 0.95 | -0.16 | 11.65 | 1.10 |
| 90-99 | 0.91 | 0.77 | 0.77 | 0.78 | 0.92 | 0.92 | 0.92 | 1.49 | 13.68 | -0.18 |

Fig. 4F

| Contract Month | Mortgage Index Calibration Day | First Trading Day | Last Trading Day | BMA Notification Day |
|---|---|---|---|---|
| Dec 2000 | 8/7/00 | 8/9/00 | 12/7/00 | 12/11/00 |
| Jan 2001 | 9/8/00 | 9/11/00 | 1/9/01 | 1/11/01 |
| Feb 2001 | 10/6/00 | 10/9/00 | 2/6/01 | 2/8/01 |
| Mar 2001 | 11/7/00 | 11/9/00 | 3/7/01 | 3/9/01 |
| Apr 2001 | 12/7/00 | 12/11/00 | 4/9/01 | 4/11/01 |
| May 2001 | 1/8/01 | 1/10/01 | 5/8/01 | 5/10/01 |
| Jun 2001 | 2/7/01 | 2/9/01 | 6/7/01 | 6/11/01 |
| Jul 2001 | 3/7/01 | 3/9/01 | 7/10/01 | 7/12/01 |
| Aug 2001 | 4/6/01 | 4/10/01 | 8/7/01 | 8/9/01 |
| Sep 2001 | 5/7/01 | 5/9/01 | 9/11/01 | 9/13/01 |
| Oct 2001 | 6/7/01 | 6/11/01 | 10/9/01 | 10/11/01 |
| Nov 2001 | 7/9/01 | 7/11/01 | 11/07/01 | 11/09/01 |
| Dec 2001 | 8/7/01 | 8/9/01 | 12/07/01 | 12/11/01 |
| Jan 2002 | 9/10/01 | 9/12/01 | TBD | TBD |
| Feb 2002 | 10/5/01 | 10/9/01 | TBD | TBD |
| Mar 2002 | 11/7/01 | 11/9/01 | TBD | TBD |
| Apr 2002 | 12/7/01 | 12/11/01 | TBD | TBD |

*Fig. 6*

METHOD FOR STRUCTURING, PRICING AND SETTING A CURRENT MORTGAGE PRICE INDICATOR CONTRACT

This application claims priority from U.S. Provisional Patent Application Ser. No. 60/226,589, filed Aug. 21, 2000. The entirety of that application is incorporated herein by reference.

BACKGROUND OF THE INVENTION

1. Field of the Invention

The present invention relates generally to financial instruments, and more particularly, to the processing, valuing and trading of mortgage-related financial instruments.

2. Related Art

Consumers who desire to purchase a home usually borrow funds from a lender (e.g., a bank, finance company or the like, who are also called "originators" or "lenders"). As is well known in the relevant art(s), the legal document by which a consumer (i.e., the borrower) uses the mortgaged property as security to guarantee repayment of the loan is known as a mortgage (or mortgage loan).

Today, lenders sell over half of all mortgage loans they originate into the secondary market. By selling mortgage loans into the secondary market, lenders liberate capital in order to have funds to meet additional consumer demand for home mortgages. That is, the secondary market keeps the supply of money for housing widely available and ultimately lowers costs to borrowers.

Within the secondary market, lenders normally sell conventional mortgages (i.e., those not guaranteed or insured by the Federal Housing Administration or Veterans Administration) to a secondary market conduit or wholesaler, or directly to the Federal Home Loan Mortgage Corporation ("Freddie Mac") or the Federal National Mortgage Association ("Fannie Mae"). The majority of these mortgages are sold to Freddie Mac or Fannie Mae (each, an "Agency") for cash or in exchange for mortgage-backed securities. The Agencies pool, or "securitize," the mortgages by creating mortgage-backed securities ("MBS") backed by the purchased mortgages. Each respective Agency guarantees principal and interest payments on the MBS issued by it. Most newly issued MBS are sold (forward, usually one-to-three months) by participants in this market to broker-dealers, banks, pension funds, insurance companies, money market funds or other institutions. In other words, the MBS may be already sold prior to its issuance and/or delivery to the seller of that MBS.

Certain MBS are "TBA" (to-be-announced) eligible. In order to be TBA-eligible, newly-issued MBS must meet requirements determined, from time to time, by the Bond Market Association ("BMA") of New York, N.Y., including requirements relating to pool size and the types and similarity of mortgages within such a pool. In addition to some basic information about the TBA MBS (for example its coupon and issuer), a purchaser of a TBA MBS typically knows only the general characteristics of the mortgages comprising it, such as the original terms (years) of the underlying mortgages. The underlying concept of TBA MBS is that they are fungible. In other words, they are sufficiently similar that it does not or should not matter to an investor which particular MBS it purchases so long as the MBS satisfies the investor's basic requirements as to coupon rate, term and other factors described above. The United States MBS market is the second largest component of the fixed-income investment market, and mortgages comprise almost twenty percent of the financial instrument universe.

In 1999, the Federal Reserve estimated the value of the MBS market at $2.3 trillion in outstanding supply, with $67 billion trading per day. Yet, the United States MBS market is the largest cash market in the world currently without a futures market counterpart. (In the 1970s and 1980s, the Chicago Board of Trade (the "CBOT") launched a series of mortgage-based futures contracts (collectively, "GNMA Futures Contracts") based on mortgage-backed securities guaranteed by the Government National Mortgage Association ("GNMA"), an agency whose guaranty of FHA/VA loans is backed by the full faith and credit of the United States government; yet, issues of timing and contract design eventually led to their demise.)

The total outstanding supply of MBS is second only to that of Treasury securities, and it is projected that the outstanding supply of MBS will eclipse that of Treasury securities within the next few years. In the absence of a viable futures market alternative, the cash forward market has, in many ways, evolved to fulfill the role typically played by a traditional futures market—but without many of the benefits. That is, the cash forward market lacks the efficiency, operational simplicity and credit protection afforded by an exchange-based futures market.

Further, mortgage market participants need a more effective hedging instrument in the wake of increased market volatility and events such as the liquidity crisis of 1998. Hedging, as will be apparent to one skilled in the relevant art(s), is, at its simplest level, a trade designed to reduce risk, such as protecting against a possible loss in an existing asset (e.g., a mortgage commitment) by buying or selling another asset (e.g., an option) that would offset the loss. Generally speaking, a futures contract is a standardized, transferable agreement between parties, which may be exchange-traded, to buy or sell an asset at a specified time in the future for a specified price. Futures contracts typically traded on regulated financial exchanges are marked to market daily (based on their current value in the marketplace). Futures contracts are explained in detail in John C. Hull, *Options, Futures, and Other Derivative Securities*, Prentice Hall, ISBN 0130224448 (4th ed. 2000), which is incorporated herein by reference in its entirety.

As with futures contracts for other types of assets, a corresponding option contract for MBS would enhance the appeal and utility of both instruments. Basically, an options contract, in this context, is an agreement between parties that represents the right to buy or sell a specified amount of the underlying contract at a specified price within a specified time. The parties to options contracts are purchasers who acquire "rights," and sellers who assume "obligations." Further, a "call" option contract gives one the right to buy the underlying security, whereas a "put" option contract gives one the right to sell the underlying security at a certain price. Typically, the purchaser pays the seller an up-front, non-refundable premium to obtain the option rights. Options contracts are explained in detail in the above-cited Hull, *Options, Futures, and Other Derivative Securities*.

At present, over-the-counter ("OTC") mortgage option contracts are available, but highly illiquid. The use of option contracts is of particular importance to mortgage originators, mortgage servicers and mortgage derivatives market players, who incur significant basis risk using Treasury futures and Treasury options, since changing spreads have adversely affected their hedging efficiency. Basis risk is the difference between the market value of the mortgages and Treasuries, for example, or such other mortgage hedge utilized.

Given the above, a mortgage a futures contract and a corresponding options contract linked to currently issued MBS coupons would reflect current and recent MBS production (issuance), provide an effective hedge, price transparency, and reduce counter party risks and operational demands.

SUMMARY OF THE INVENTION

The present invention meets the above-identified needs by providing for an exchange-traded mortgage futures contract based on a current mortgage price indicator ("CMPI") or current mortgage index (referred to herein as the "Mortgage Futures Contract") and a corresponding option contract.

The Mortgage Futures Contract, according to the present invention, fulfills several important needs that are either currently lacking, or performing inefficiently, in the marketplace, including: (i) those of mortgage originators to hedge their mortgage pipelines between the time they originate mortgages and when they sell the mortgages in the secondary market; (ii) those of MBS dealers to hedge their MBS inventories (or other financial instruments closely correlated with MBS) until sold; and (iii) those of mortgage servicers and portfolio managers to rebalance and manage their portfolios.

The present invention adds value over and above MBS cash market executions (a currently used hedge) and fulfills the hedging and speculative needs of a wide range of MBS market participants (portfolio managers, dealers, servicers, originators and arbitrageurs, among others).

Moreover, because it is based upon Freddie Mac and Fannie Mae conventional MBS only, the present invention adds consistency and reflects the current conventional mortgage environment. This composition results in risk properties that appeal to more, as well as different, market participants than the discontinued GNMA Futures Contracts. Conventional mortgages prepay differently from the non-conventional mortgages backing GNMA MBS. Consequently, in an embodiment, GNMA MBS are intentionally omitted from the Mortgage Futures Contract.

In addition, the cash settlement design of the present invention eliminates the complicated and uneconomic coupon delivery options contained in prior discontinued GNMA Futures Contracts. The cash settlement feature potentially changes the trading patterns of current market participants, bringing new participants into the MBS market by eliminating the need to physically process the delivery of the securities on which the Mortgage Futures Contract is based.

Because it is traded on an exchange, the present invention virtually eliminates counter-party risk, provides pair-off flexibility and allows for two-way margining (deposits for traders) or daily mark to market.

Further features and advantages of the invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIG. 1 is a table illustrating some of the shortcomings of the GNMA Futures Contracts and how, in an embodiment, the Mortgage Futures Contract of the present invention addresses these shortcomings;

FIGS. 4A-4F are tables of data illustrating the hedging effectiveness (using historical data) of the Mortgage Futures Contract of the present invention;

FIG. 6 is a calendar showing the annual cycle of Mortgage Futures Contract maturities according to an embodiment of the present invention.

DETAILED DESCRIPTION OF THE PREFERRED EMBODIMENTS

I. Mortgage Futures Contract Overview

Figure 2:
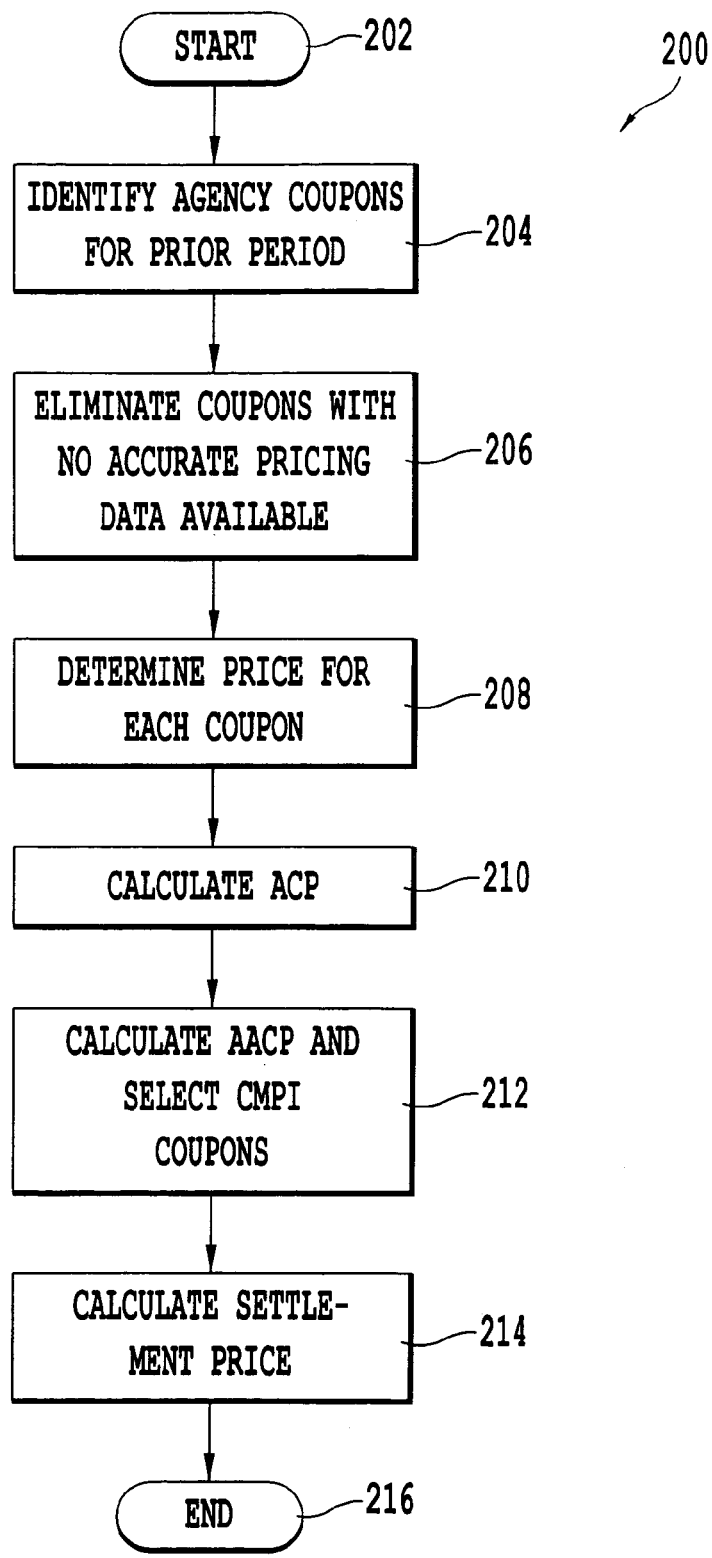
FIG. 2 is a flowchart illustrating the creation process of a mortgage-based futures contract linked to a current mortgage price indicator or index (i.e., a "Mortgage Futures Contract") according to an embodiment of the present invention.

The present invention is directed to a futures contract and a corresponding options contract based on a current mortgage price indicator or index (CMPI) which offer mortgage market participants an effective hedge. The recently-introduced "Agency Debt" contract (i.e., a futures contract trading on the yield of specified Freddie Mac and Fannie Mae debt) has proven successful, creating the opportunity for efficient and synergistic basis trading, while further suggesting that market timing is advantageous for an exchange-traded, mortgage-related futures contract. In an embodiment, the design of the Mortgage Futures Contract differs from prior GNMA Futures Contracts in at least the following respects:

First, the Mortgage Futures Contract offers a broader commercial appeal than prior GNMA Futures Contracts, which were targeted virtually exclusively to originators of mortgages. The Mortgage Futures Contract construction, in an embodiment of the present invention, produces a financial instrument that reflects the dynamics of new issuance to attract originator hedging, yet also presents empirical properties useful to a wide range of other MBS market participants. For example, most MBS origination is priced close to "par" (principal amount). Transactions resecuritizing MBS, such as "REMIC" and "Strip" transactions, also tend to be concentrated in recent production coupons. Thus, most dealer trading and inventories focus primarily on MBS coupons closest to par.

More specifically, the Mortgage Futures Contract is based upon, in one embodiment, three coupons and, in an embodiment, uses a "25/50/25" percent weighting scheme to determine the specific MBS coupons. The coupon composition reflects a balance between the last three months of mortgage and MBS production as well as a "pull to par" feature that anticipates future production. The choice of coupons included in the CMPI reflects empirical evidence indicating that the bulk of recent cash market trading activity has occurred in these coupons. Unlike the prior GNMA Futures Contracts (which used, for example, one coupon and/or conversion factors), the Mortgage Futures Contract's broader coupon composition, together with its reflection of recent coupon production, significantly alters the resulting risk properties and considerably broadens the appeal of the Mortgage Futures Contract to mortgage and MBS market participants.

Second, the design of the Mortgage Futures Contract, according to an embodiment of the present invention, eliminates complicated and uneconomic physical delivery settlement options contained in some of the prior GNMA Futures Contracts. This change to a cash settlement design results in better hedging characteristics and less "back-office" or administrative work associated with the physical delivery of the underlying securities. The Mortgage Futures Contract includes a cash settlement feature that can change the trading patterns of current market participants and bring new participants into the market. Third, for each of the three coupons, the CMPI determines the "cheaper to deliver" of the Fannie Mae or Freddie Mac MBS at settlement. This pricing mechanism facilitates price transparency and spreading against other futures contracts (because it parallels cheaper-to-deliver CBOT physical delivery futures standards). Significantly, this feature provides protection against a "squeeze" in any one coupon and thus market manipulation.

Fourth, the Mortgage Futures Contract, by virtue of being traded on an exchange, virtually eliminates counter-party risk (unlike the prior GNMA Futures Contracts, which were settled by the clearing system offered by the Mortgage-Backed Securities Clearing Corporation of New York, N.Y. or the "MBSCC"), provides pair-off flexibility and allows for two-way margining.

Fifth, the corresponding options contracts provide new means to manage convexity—a measure of the curvature in the relationship between prices and yields.

Mortgages and MBS have unique investment risks associated with them. In addition to interest rate risk, prepayment risk is paramount, including varying durations and convexities, as well as basis risk stemming from prepayments or shifts in supply or demand for mortgages. The Mortgage Futures Contract provides a valuable risk management tool for many segments of the mortgage market, including: portfolio managers needing a hedge with a close correlation to the mortgage universe; dealers needing a hedge with a close correlation to the values of their inventories (mortgages or other financial instruments); arbitrageurs needing protection against squeezes; hedge funds needing a capital-efficient trading vehicle that allows easy access to the mortgage basis; mortgage originators needing a hedge with close correlation to price movements on mortgage production; and speculators and arbitrageurs needing liquidity in basis trading.

In sum, a table 100 appears in FIG. 1 illustrating some of the shortcomings of prior GNMA Futures Contracts and how, in an embodiment, the Mortgage Futures Contract of the present invention addresses these shortcomings.

In addition to providing better hedge effectiveness, market participants will be able to juxtapose the Mortgage Futures Contract of the present invention with the existing Treasury futures contracts and the Agency Debt (10-year) contract, thus providing a convenient and efficient vehicle for basis trading among these sectors. The success of Treasury/Agency spread ("TAG") trading foreshadows the potential synergy that the addition of the Mortgage Futures Contract will generate in the mortgage and MBS markets.

Further, options on the Mortgage Futures Contract will provide additional benefits for market participants. For example, mortgage originators face fallout risk to their pipelines of loans, which occurs when mortgage applicants do not complete the loan process by obtaining their mortgages. Most often, fallout occurs during periods of declining interest rates, when applicants choose to pursue lower rates elsewhere. In such situations, the originator with a mandatory delivery commitment at the higher interest rate will have to purchase a market rate loan and deliver it at a discount for a loss. If rates rise, however, borrowers have strong incentives to close on their mortgage commitments. Options are ideally suited to hedge this type of asymmetric interest rate risk. Hence, mortgage originators would benefit from trading options on the Mortgage Futures Contract in order to hedge their fallout risk.

II. Mortgage Futures Contract Design

A. Environment

The MBS market includes a wide variety of participants having equally varied objectives. For example, mortgages are originated continuously and generally settle within ninety days or less from the beginning of the application process. To hedge these mortgage commitments, originators sell MBS with similar characteristics into the forward markets (i.e., to be delivered at a specified time in the future after MBS formation). Dealers, on the other hand, often maintain multiple mortgage (rate) and Agency positions across their securities trading (pass-through and derivative) desks. Pass-through traders position a full range of coupons, while the derivative traders often inventory the most recently produced coupons in attempts to generate structured arbitrages.

Investors come in many varieties. For example, banks and insurers often take a long-term, buy-and-hold perspective, which favors yield (i.e., the return on a single instrument type) over total return (of the entire portfolio). Active investment managers favor short-term price performance and migrate to the more liquid coupons. A successful mortgage futures contract must satisfy a large cross-section of this extremely diverse market, while generating offsetting long (purchase) and short (sale of security not yet owned) positions.

The Mortgage Futures Contract of the present invention is designed to closely track the core trading volume generated by the above-described participants. Generally speaking, accomplishing this requires a combined focus on the current MBS coupon and recent mortgage production. Ideally, a mortgage futures contract would also correlate closely to the movements of mortgage rates, providing a close proxy for the overall mortgage basis. As detailed below, the Mortgage Futures Contract of the present invention meets all of these requirements, while creating ease in execution.

B. Composition, Weights and Inclusion Rules

In an embodiment of the present invention, the Mortgage Futures Contract is an index based on three recent coupons for 30-year Freddie Mac and Fannie Mae MBS that are closest to par value (of the principal amount of the security). In an embodiment, only 30-year securities are used because they account for approximately 82% of the Agencies' MBS issuance.

In an embodiment, the CMPI or index composition is limited to conventional MBS for at least two reasons. First, Freddie Mac and Fannie Mae MBS currently represent a significant percentage of all 30-year securities issued and outstanding. Second, GNMA securities have different investment characteristics and would diminish the usefulness of the index in basis trading.

By limiting the composition of the Mortgage Futures Contract to Fannie Mae and Freddie Mac MBS, in an embodiment, Mortgage Futures Contract traders can easily isolate specific conventional mortgage price movements from overall market and credit spread movements and take offsetting positions (for example, in the Agency Debt contract).

The index composition is intended to reflect a balance between the last three months of mortgage production (origination) and a "pull to par" that anticipates future production. Statistically, the three coupons included in a given CMPI should be representative of the 30-year trades in Freddie Mac and Fannie Mae MBS over the previous three months, according to historical data publicly available from the MBSCC. Thus, because the Mortgage Futures Contract is built around the most actively traded coupons, the availability of accurate pricing is assured.

Referring to FIG. 2, a flowchart illustrating the creation (i.e. structuring) process 200 of a Mortgage Futures Contract according to an embodiment of the present invention is shown. Process 200 begins at step 202 with control passing immediately to step 204.

In step 204, each month, at the beginning of each Mortgage Futures Contract, Freddie Mac and Fannie Mae MBS coupons are designated for inclusion in the CMPI by a survey of randomly selected MBS dealers In an embodiment, these coupons represent the MBS production for the prior three-month period. Each Mortgage Futures Contract is listed four months prior to its expiration. The composition of the coupons for a Mortgage Futures Contract is determined one business day before the listing of the Mortgage Futures Contract (i.e., the $7^{th}$ business day of the fourth month preceding expiration). For example, the coupons for the June Mortgage Futures Contract are determined on the $6^{th}$ business day of February and the Mortgage Futures Contract is listed on the $7^{th}$ business day of February.

In step 206, the total dollar amount of conventional 30-year fixed-rate Fannie Mae and Freddie Mac MBS issued in the preceding three months is calculated. In an embodiment, any MBS with a coupon representing less than 5% of the total production for the relevant period is excluded since accurate pricing may not be available. Thus, any such coupons are excluded from the set of coupons identified in step 204.

In step 208, the coupon price for each coupon from the set of coupons identified in step 204 (and remaining from step 206) is determined. Currently, MBS dealers quote closing marks (prices) on the Class A MBS (including Freddie Mac and Fannie Mae MBS) for TBA delivery four months forward with a face value equal to or greater than $5,000,000. The median of the dealers' mid-quotes (between bid and offer) is then determined for each coupon, by Agency. The "Coupon Price," which is the average of Fannie Mae and Freddie Mac median dealer prices for the coupon with each agency price weighed by its share of total dollar issuance for the coupon, is calculated as follows:

$$\text{Coupon Price} = \frac{\sum_A \text{issuance}(i, A) * \text{price}(i, A)}{\text{total issuance}(i)}$$

where i=ith coupon, and $A \in \{\text{Fannie Mae, Freddie Mac}\}$.

In step 210, the Average Coupon Price ("ACP") is calculated. The ACP, which is the issuance-weighted average of median dealer prices for all coupon levels and for both agencies, is determined as follows:

$$\text{Average Coupon Price} = \frac{\sum_{K,A} \text{issuance}(k, A) * \text{price}(k, A)}{\text{total issuance}};$$

where $k \in \{\text{all coupons}\}$, and $A \in \{\text{Fannie Mae, Freddie Mac}\}$.

In step 212, the Par-Adjusted Average Coupon Price (AACP) pulls the ACP to par as follows:

$$AACP = \frac{(100 + \text{Average Coupon Price})}{2}.$$

Next, the three coupons selected for the CMPI are those with Coupon Prices closest to the AACP. The coupon with the closest price has a 50% weight. The next two closest coupons have a weight of 25%. If two coupons are equally close to the AACP, the higher coupon is used. If only two coupons qualify for inclusion, then each is weighted 50%. Assigned weights remain constant over the life of the contract and are also the weights used to determine the CMPI for purposes of final contract settlement.

In step 214, two days before the BMA Notification Day (for TBA delivery of Class A MBS) and the last trading day for that Mortgage Futures Contract, the settlement price for the current Mortgage Futures Contract is calculated. In an embodiment, that price is based on a random survey of approximately seven to ten MBS dealers. Dealers quote bid and offer prices for eligible Fannie Mae and Freddie Mac MBS current coupons and the median of the dealers' midquotes is determined for each coupon and each Agency.

In an embodiment of the present invention, a formula is applied to the Fannie Mae MBS price to adjust for the difference between the Fannie Mae and Freddie Mac cash flows, which accounts for the 10-day differential in payments to investors on Fannie Mae and Freddie Mac MBS. The adjusted Fannie Mae price $P_a$ is given by:

$$P_a = P(1+\rho)^{10/365}$$

where $\rho$ is a yield approximation. If the price of a Fannie Mae MBS is equal to 100, price P is set equal to its coupon. If the prices of all Fannie Mae MBS are either below or above 100, $\rho$ is the coupon of the Fannie Mae MBS closest to 100. Otherwise, $\rho$ will be the weighted average of the two coupons whose prices straddle 100 (weighted proportionally to their respective distances to 100):

$$\rho = \frac{\text{high coupon} * (100 - \text{low coupon price}) + \text{low coupon} * (\text{high coupon price} - 100)}{(\text{high coupon price} - \text{low coupon price})}$$

For each coupon, the minimum of the Freddie Mac and adjusted Fannie Mae price is determined. This minimum is the (cheaper-to-deliver) price used to represent the coupon in the CMPI at expiration (i.e., the settlement price). For example, where 1, 2, and 3 are the ranks of the respective coupons (i.e., closeness to the AACP as identified in step 212):

Settlement Price=$0.5*\min[P_a^{Fan\ 1}, P^{Fred\ 1}] + 0.25*\min[P_a^{Fan\ 2}, P^{Fred\ 2}] + 0.25*\min[P_a^{Fan\ 3}, P^{Fred\ 3}];$ If there are fewer than three eligible coupons, the weights are adjusted accordingly (e.g., 50% for two current coupons).

Process 200 then ends as indicated by step 216.

TABLE 1 below illustrates a sample timeline for listing and settlement for a hypothetical April 2001 Mortgage Futures Contract.

TABLE 1

| Date | Timeline | Event |
| --- | --- | --- |
| 7 Dec. | 5th business day of month | Fannie Mae and Freddie Mac Factor Day |
| 11 Dec. | 7th business day of month | Listing of April futures contract (first trading day) |
| 9 Apr. 2001 | 2nd business day before MBSCC Notification Day | Expiration of April futures contract (last trading day) |
| 11 Apr. | 2nd business day before MBSCC Settlement Day | MBSCC 48-Hour Day (Notification Day) |
| 16 Apr. | | MBSCC Settlement Day |

In an embodiment, the new coupon composition is used to determine the CMPI coupon on the seventh business day of the month, four months prior to the Mortgage Futures Contract settlement. An important property of the Mortgage Futures Contract is that the weight of each coupon is held constant throughout the contract's duration.

In an embodiment, the Mortgage Futures Contracts are traded on a financial exchange on a monthly cycle. FIG. 6 illustrates an example of the annual cycle of Mortgage Futures Contract maturities according to such an embodiment. As shown in FIG. 6, the upcoming Mortgage Futures Contract is announced and begins trading one month in advance of the time that it replaces the current Mortgage Futures Contract.

Figure 3:
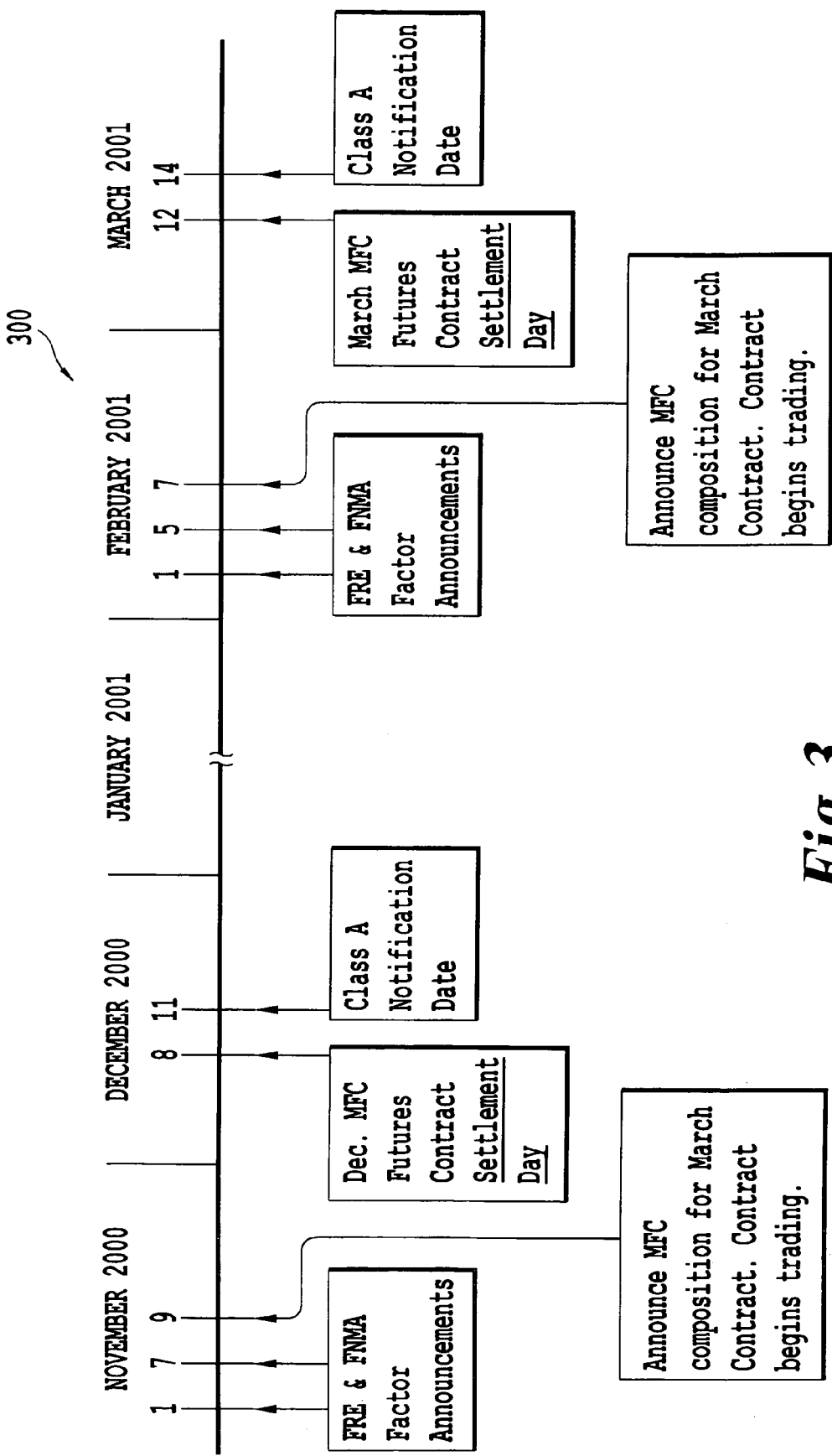
FIG. 3 is a timeline illustrating a quarterly cycle of a Mortgage Futures Contract according to an embodiment of the present invention.

In a time line 300 shown in FIG. 3, the composition for the March Mortgage Futures Contract is announced in November after the Freddie Mac ("FRE") and Fannie Mae ("FNMA") factors are announced (currently, fifth business day of the month for each). Because the composition of the upcoming Mortgage Futures Contract is pre-announced, an investor can avoid the uncertainty associated with changes in Mortgage Futures Contract composition by trading in the current Mortgage Futures Contract(s). The dynamic nature of the Mortgage Futures Contract of the present invention is also designed to avoid the coupon obsolescence problem that contributed significantly to the demise of the prior GNMA Futures Contract.

C. Mortgage Futures Contract Specifications

As will be appreciated by one skilled in the relevant art(s), an exchange can change any of the Mortgage Futures Contract's features described below without departing from the scope of the present invention described herein.

1. Delivery Months

In an embodiment of the present invention, a financial exchange, such as Chicago Mercantile Exchange ("CME") or the CBOT may facilitate the trading of the Mortgage Futures Contract for quarterly settlement. In another embodiment, the financial exchange may facilitate the trading of the Mortgage Futures Contract for monthly settlement. In yet another embodiment, the financial exchange may facilitate the trading of the Mortgage Futures Contract for monthly and quarterly settlements, or any combination or variation of the above.

2. Last Trading Day/Settlement Day

In an embodiment, the last trading day for the Mortgage Futures Contract is two business days prior to BMA Notification Day for 30-year Freddie Mac and Fannie Mae MBS. On this day, MBS prices for the current month are still available and reliable. Thus, the last trading day is the same day as the settlement date for the current Mortgage Futures Contract.

3. Mortgage Futures Contract Size

In an embodiment of the present invention, an exchange would facilitate the trading of a Mortgage Futures Contract having a size of US$100,000. This size is identical to the actively traded Treasury futures contracts. It is also the same size as the recently introduced Agency Debt contracts offered and exchanged on the CME and CBOT. This allows for easier price comparison and spread trading among the three contract types (i.e., Treasury, Agency Debt and Mortgage Futures).

4. Minimum Price Change

In an embodiment of the present invention, a financial exchange would, by rule, set the minimum price change of a Mortgage Futures Contract to a quarter of a tick (i.e., $\frac{1}{32}^{nd}$ of a percent). That equals US$7.8125 for a US$100,000 Mortgage Futures Contract.

5. Settlement and Pricing

As mentioned above, in an embodiment, the Mortgage Futures Contract incorporates both a cash settlement and a cheaper-to-deliver pricing feature. At settlement, the exchange calculates the final settlement amounts for the Mortgage Futures Contract by polling dealers for closing marks for the three pre-selected contract coupons for each Agency and determines which Agency TBA is cheaper. To make this determination, the exchange applies a cash-flow adjustment factor to the Fannie Mae TBA prices at each coupon level. This price adjustment compensates for the 10-day cash-flow lag that separates the TBA pricing of the two Agencies. In most cases, the yield used to make this adjustment will be a price-weighted average of the two Fannie Mae coupon prices that straddle par. Using the cheaper TBA price as the settlement price, the Mortgage Futures Contract is cash settled based on a calculation of its final composition. The Mortgage Futures Contract has one monthly settlement day, which is, as mentioned above, two business days prior to BMA Notification Day.

Typically, a major concern in using a cash settlement feature is the accuracy of the data used in defining the settlement price. Fortunately, pricing across dealers has been historically and consistently uniform in the MBS TBA market, making cash settlement a viable option for the Mortgage Futures Contract. Dealers quote closing marks on Class A (including 30-year conventional) MBS for TBA delivery four months forward and with face values equal to or greater than $5,000,000. Quotes are in points and $\frac{1}{128}$th points, with one point worth $1000.

III. CMPI Option Contract Counterpart

As with other futures contracts, a corresponding options contract enhances the appeal and utility of both instruments. At present, OTC mortgage option contracts are available, but illiquid. The use of options should be of particular importance to mortgage originators, mortgage servicers and mortgage derivatives players, who incur significant basis risk using Treasury futures and Treasury options. Thus, in one embodiment of the present invention, an exchange may facilitate the trading of an option contract that corresponds to the Mortgage Futures Contract. In one embodiment, such an option contract would be traded on the same monthly cycle as the underlying futures contract and have the characteristics presented in TABLE 2 below.

TABLE 2

| Characteristic | Details |
| --- | --- |
| Trading Unit: | One Mortgage Futures Contract. |
| Price Basis: | Points and quarters of 1/32 of one point, with one point equal to $1,000. |
| Tick Size: | One quarter of 1/32 of one point ($7.8125), rounded up to the nearest one cent. |
| Strike Prices: | Listed in half-point ($500) increments to bracket the previous day's settlement price in the underlying futures contract, i.e., the at-the-money strike plus the next 15 consecutively higher and lower strikes. |
| Daily Price Limits: | None. |
| Contract Months: | Same as Futures. |
| Last Trading Day: | Same as Futures. |
| Exercise Procedure: | American exercise. The holder can exercise on any business day that the option is traded by giving notice by 6:00 p.m. Chicago time to the Board of Trade Clearing Corporation. |
| Expiration: | Unexercised options will expire at 6:00 p.m. Chicago time on the last day of trading. |
| Trading Hours: | Open outcry: 7:20 a.m. to 2:00 p.m. Chicago time, Monday through Friday. a/c/e: 8:00 p.m. to 4:00 p.m. Chicago time, Sunday through Friday. |
| Position Limits and Reportable Positions: | Spot limit of 5,000 contracts on a futures equivalency basis with an aggregate outright limit of 5,000 contracts and a reportable limit of 50 contracts |
| Ticker Symbols: | Open outcry: MFC for calls/MFP for puts a/c/e: OZG |

IV. Measuring Hedging Effectiveness

In order to attract a full range of mortgage market participants to the Mortgage Futures Contract, correlation between the Mortgage Futures Contract and a variety of benchmarks is necessary. Considering the potential users of the Mortgage Futures Contract, a regression analysis was performed comparing the Mortgage Futures Contract to the following benchmarks: Lehman Brothers Mortgage Index ("LBMI"), the Salomon Brothers Mortgage Index ("SBMI") and the (conventional) "par" (or closest to par) coupon for the historical period of 1990-99. The resulting data, shown in FIG. 4A, indicates that the Mortgage Futures Contract (MFC) of the present invention provides a more effective hedge for MBS portfolio risk dimensions than do any of these existing cross-hedges. This is particularly evident during episodes of extreme market volatility, such as those in 1998 and 1999.

A significant and conservative assumption made in the regression analyses presumed a naive 1:1 hedge ratio of the Mortgage Futures Contract to each independent benchmark. Stronger correlations, however, could be attained through a more dynamic re-balancing of the hedge. The results of the analyses are shown in FIG. 4A. The $R^2$ statistic explains the variation in the portfolio being hedged by the respective hedge instrument. In general, as is well known by those skilled in the relevant art(s), $R^2$ is the relative predictive power of a model (i.e., the regression analysis). The $R^2$ value is a descriptive measure between 0 and 1, where the closer it is to one, the more accurate (or predictive) the model is. For example, hedging the LBMI is done most effectively over the entire 1990-1999 period with the Mortgage Futures Contract (highest $R^2$=0.93) compared with the Conventional Par Coupon ($R^2$=0.86), 10-year interest rate swap ($R^2$=0.78) and the 10-year Treasury note futures contract ($R^2$=0.79).

The Mortgage Futures Contract would have been the superior hedge in both sub-periods of 1990-94 and 1995-99, and in all but one individual year for the LBMI and SBMI indices. The Mortgage Futures Contract also would have been the superior hedge instrument for the par MBS coupon for the entire term and in both sub-periods. The Mortgage Futures Contract would have provided the best hedge instrument for both portfolio managers and mortgage originators. This is particularly evident during the massive spread widening in 1998 and 1999 where the Mortgage Futures Contract would have been the superior hedge to both swaps and Treasury hedges.

A stronger test of the LBMI and SBMI hedging effectiveness is provided in FIG. 4B and FIG. 4C, respectively. In these tables, the Mortgage Futures Contract is compared against a hedge strategy using a combination of the par coupon and 10-year swaps. There is an improvement over using these two hedge instruments individually, but the joint hedge would still have been considerably less effective than the CMPI. FIG. 4D illustrates data of par coupon hedging effectiveness with the Mortgage Futures Contract in combinations with Treasuries and swaps. As expected, the multiple hedge scenario would be the best, but the t-statistics reveals that the Mortgage Futures Contract would have been the major contributor to the hedging effectiveness of the par coupon. Likewise, FIG. 4E and FIG. 4F provide evidence of modest improvement in hedging effectiveness for the LBMI and SBMI, respectively, over the Mortgage Futures Contract alone with combinations of the Mortgage Futures Contract, Treasuries and swaps. Again, the dominant contributor to effectiveness is the Mortgage Futures Contract.

As the analyses illustrated in FIGS. 4A-4F demonstrate, the Mortgage Futures Contract of the present invention would have been a superior hedge vehicle for mortgage originators, dealers, investors and hedge funds over the last ten years. Given current trends, the Mortgage Futures Contract will provide the superior hedge opportunity in the future.

V. Example Implementations

Figure 5:
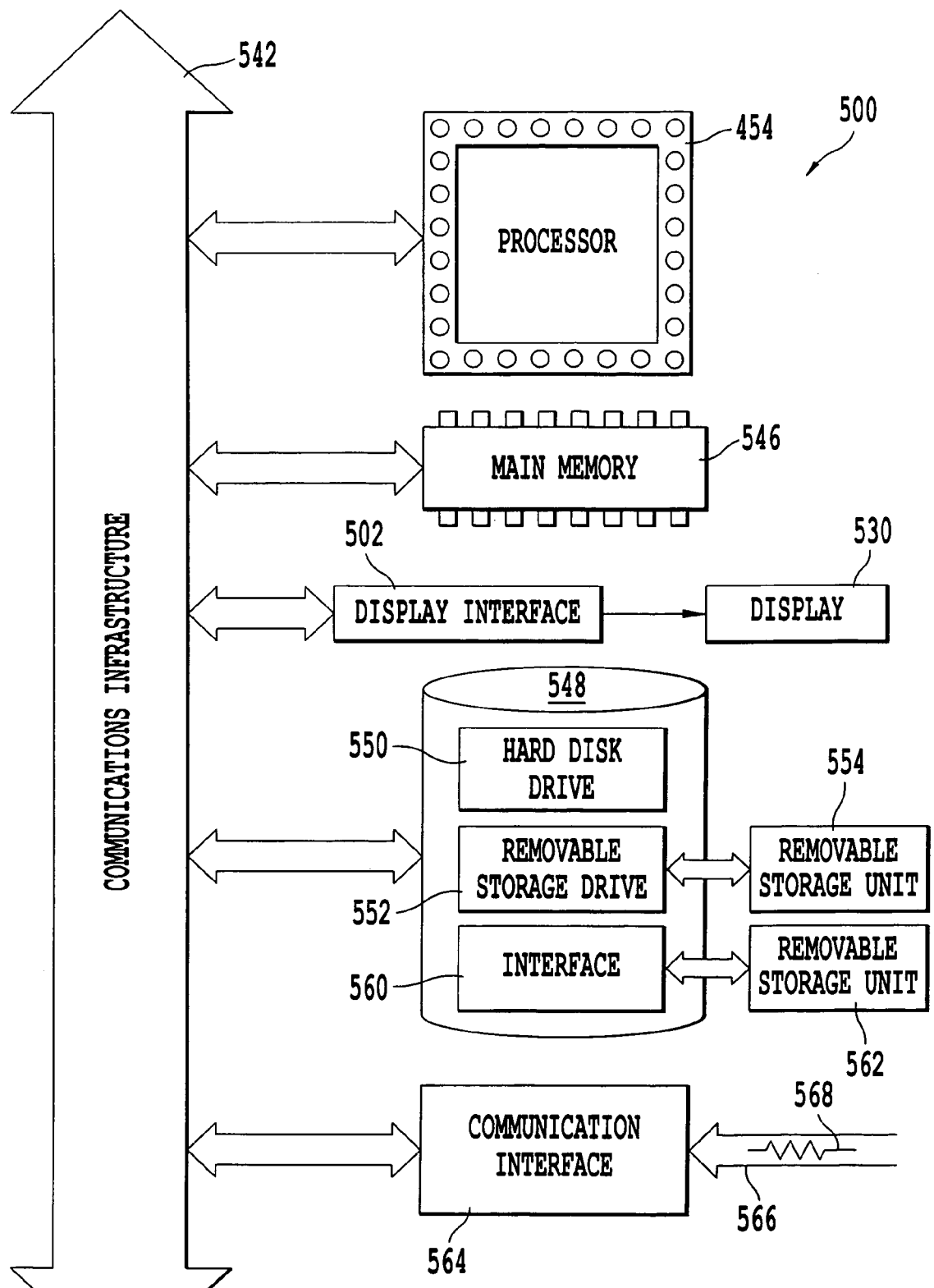
FIG. 5 is a block diagram of an example computer system for implementing the present invention.

The present invention (i.e., process 200 or any of the part thereof, or the trading, valuing, or pricing of the CMPI Contract and its option contract counterpart) may be implemented using hardware, software or a combination thereof and may be implemented in one or more computer systems or other processing systems. In fact, an example of a computer system 500 is shown in FIG. 5. The computer system 500 represents any single or multi-processor computer. In conjunction, single-threaded and multi-threaded applications can be used. Unified or distributed memory systems can be used. Computer system 500, or portions thereof, may be used to implement the present invention. For example, the system 200 of the present invention may comprise software running on a computer system such as computer system 500.

In one example, the system 200 of the present invention is implemented in a multi-platform (platform independent) programming language such as JAVA™, programming language/structured query language (PL/SQL), hyper-text mark-up language (HTML), practical extraction report language (PERL), common gateway interface/structured query language (CGI/SQL) or the like. Java™-enabled and JavaScript™-enabled browsers are used, such as, Netscape™, HotJava™, and Microsoft™ Explorer™ browsers. Active content Web pages can be used. Such active content Web pages can include Java™ applets or ActiveX™ controls, or any other active content technology developed now or in the future. The present invention, however, is not intended to be limited to Java™, JavaScript™, or their enabled browsers, and can be implemented in any programming language and browser, developed now or in the future, as would be apparent to a person skilled in the relevant art(s) given this description.

In another example, the system 200 of the present invention, may be implemented using a high-level programming language (e.g., C++) and applications written for the Microsoft Windows™ NT or SUN™ OS environments. It will be apparent to persons skilled in the relevant art(s) how to implement the invention in alternative embodiments from the teachings herein.

Computer system 500 includes one or more processors, such as processor 544. One or more processors 544 can execute software implementing the routines described above. Each processor 544 is connected to a communication infrastructure 542 (e.g., a communications bus, cross-bar, or network). Various software embodiments are described in terms of this exemplary computer system. After reading this description, it will become apparent to a person skilled in the relevant art how to implement the invention using other computer systems and/or computer architectures.

Computer system 500 can include a display interface 502 that forwards graphics, text, and other data from the communication infrastructure 542 (or from a frame buffer not shown) for display on the display unit 530.

Computer system 500 also includes a main memory 546, preferably random access memory (RAM), and can also include a secondary memory 548. The secondary memory 548 can include, for example, a hard disk drive 550 and/or a removable storage drive 552, representing a floppy disk drive, a magnetic tape drive, an optical disk drive, etc. The removable storage drive 552 reads from and/or writes to a removable storage unit 554 in a well-known manner. Removable storage unit 554 represents a floppy disk, magnetic tape, optical disk, etc., which is read by and written to by removable storage drive 552. As will be appreciated, the removable storage unit 554 includes a computer usable storage medium having stored therein computer software and/or data.

In alternative embodiments, secondary memory 548 may include other similar means for allowing computer programs or other instructions to be loaded into computer system 500. Such means can include, for example, a removable storage unit 562 and an interface 560. Examples can include a program cartridge and cartridge interface (such as that found in video game console devices), a removable memory chip (such as an EPROM, or PROM) and associated socket, and other removable storage units 562 and interfaces 560 which allow software and data to be transferred from the removable storage unit 562 to computer system 500.

Computer system 500 can also include a communications interface 564. Communications interface 564 allows software and data to be transferred between computer system 500 and external devices via communications path 566. Examples of communications interface 564 can include a modem, a network interface (such as Ethernet card), a communications port, interfaces described above, etc. Software and data transferred via communications interface 564 are in the form of signals 568 which can be electronic, electromagnetic, optical or other signals capable of being received by communications interface 564, via communications path 566. Note that communications interface 564 provides a means by which computer system 500 can interface to a network such as the Internet.

The present invention can be implemented using software running (that is, executing) in an environment similar to that described above. In this document, the term "computer program product" is used to generally refer to removable storage unit 554, a hard disk installed in hard disk drive 550, or a carrier wave carrying software over a communication path 566 (wireless link or cable) to communication interface 564. A computer useable medium can include magnetic media, optical media, or other recordable media, or media that transmits a carrier wave or other signal. These computer program products are means for providing software to computer system 500.

Computer programs (also called computer control logic) are stored in main memory 546 and/or secondary memory 548. Computer programs can also be received via communications interface 564. Such computer programs, when executed, enable the computer system 500 to perform the features of the present invention as discussed herein. In particular, the computer programs, when executed, enable the processor 544 to perform features of the present invention. Accordingly, such computer programs represent controllers of the computer system 500.

The present invention can be implemented as control logic in software, firmware, hardware or any combination thereof. In an embodiment where the invention is implemented using software, the software may be stored in a computer program product and loaded into computer system 500 using removable storage drive 552, hard disk drive 550, or interface 560. Alternatively, the computer program product may be downloaded to computer system 500 over communications path 566. The control logic (software), when executed by the one or more processors 544, causes the processor(s) 544 to perform functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s) from the teachings herein.

VI. CONCLUSION

While various embodiments of the present invention have been described above, it should be understood that they have been presented by way of example, and not limitation.

Further, it will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A computer-based method of structuring a current mortgage price indicator (CMPI) mortgage futures contract, comprising the steps of:
   identifying with a computing device a set of mortgage-backed securities (MBS) coupons issued by a plurality of agencies for a pre-determined prior time period;
   identifying the total MBS production of said plurality of agencies during said pre-determined prior time period, and eliminating from said set of MBS coupons any coupon which does not represent more than a pre-determined level of the total MBS production during said pre-determined prior time period;

calculating with said computing device a coupon price for each of said set of MBS coupons issued by said plurality of agencies;

calculating with said computing device a par-adjusted average coupon price (AACP) for said set of MBS coupons issued by said plurality of agencies;

electronically selecting a subset containing a number N of said set of MBS coupons that is closest to said AACP;

electronically assigning a numerical weight to each of said N coupons in said subset;

including in the CMPI mortgage futures contract each of said N coupons in said subset and their corresponding numerical weights; and submitting the CMPI mortgage futures contract for trading on an exchange.

2. The method of claim 1, wherein said predetermined prior time period is three months; and said set of MBS coupons are from MBS backed by conventional 30-year mortgages.

3. The method of claim 2, wherein said pre-determined level of total MBS production of said plurality of agencies, during said pre-determined prior time period, is five percent.

4. The method of claim 3, wherein said plurality of agencies consists of Freddie Mac and Fannie Mae.

5. The method of claim 4, wherein said AACP calculation comprises the steps of:

electronically calculating an Average Coupon Price (ACP) for said set of MBS coupons issued by said plurality of agencies, wherein said ACP is equal to:

$$\frac{\sum_{k,A} \text{issuance}(k, A) * \text{price}(k, A)}{\text{total issuance}};$$

where $k \in$ {all coupons in said set of MBS coupons}, and $A \in$ {Fannie Mae, Freddie Mac}; and determining said AACP of said set of MBS coupons issued by said plurality of agencies, wherein said $$AACP = \frac{(100 + ACP)}{2}.$$

6. The method of claim 5, wherein N is equal to 3 and said step of assigning a numerical weight comprises the steps of:

assigning the coupon in said subset with the price closest to said AACP a fifty percent numerical weight; and assigning each of the remaining two coupons of said subset a numerical weight of twenty-five percent.

7. The method of claim 5, wherein N is equal to 2 and each coupon in said subset is assigned a numerical weight of fifty percent.

8. A computer program stored on a computer readable medium having control logic for causing a computer to structure a current mortgage price indicator (CMPI) mortgage futures contract, said control logic comprising:

first computer readable program code means for causing the computer to identify a set of mortgage-backed securities (MBS) coupons issued by a plurality of agencies for a pre-determined prior time period;

second computer readable program code means for causing the computer to identify the total MBS production of said plurality of agencies during said pre-determined prior time period, and eliminating from said set of MBS coupons any coupon which does not represent more than a pre-determined level of the total MBS production during said pre-determined prior time period;

third computer readable program code means for causing the computer to calculate a coupon price for each of said set of MBS coupons issued by said plurality of agencies;

fourth computer readable program code means for causing the computer to calculate a par-adjusted average coupon price (AACP) for said set of MBS coupons issued by said plurality of agencies;

fifth computer readable program code means for causing the computer to select a subset containing a number N of said set of MBS coupons that is closest to said AACP; and sixth computer readable program code means for causing the computer to assign a numerical weight to each of said N coupons in said subset.

* * * * *

UNITED STATES PATENT AND TRADEMARK OFFICE
CERTIFICATE OF CORRECTION

| | | |
|---|---|---|
| PATENT NO. | : 7,337,136 B1 | |
| APPLICATION NO. | : 09/931404 | |
| DATED | : February 26, 2008 | |
| INVENTOR(S) | : Robert J. Burns et al. | |

It is certified that error appears in the above-identified patent and that said Letters Patent is hereby corrected as shown below:

On the title page, Item (54), and column 1, line 1 should read as follows:

-- METHOD FOR STRUCTURING, PRICING AND SETTLING A CURRENT MORTGAGE PRICE INDICATOR CONTRACT --

Signed and Sealed this

Tenth Day of June, 2008

JON W. DUDAS
*Director of the United States Patent and Trademark Office*